Dec. 16, 1958  YAO T. LI  2,864,972
PRESSURE MEASURING APPARATUS

Filed Nov. 4, 1954  2 Sheets-Sheet 1

INVENTOR.
YAO TZU LI
BY
ATTORNEYS

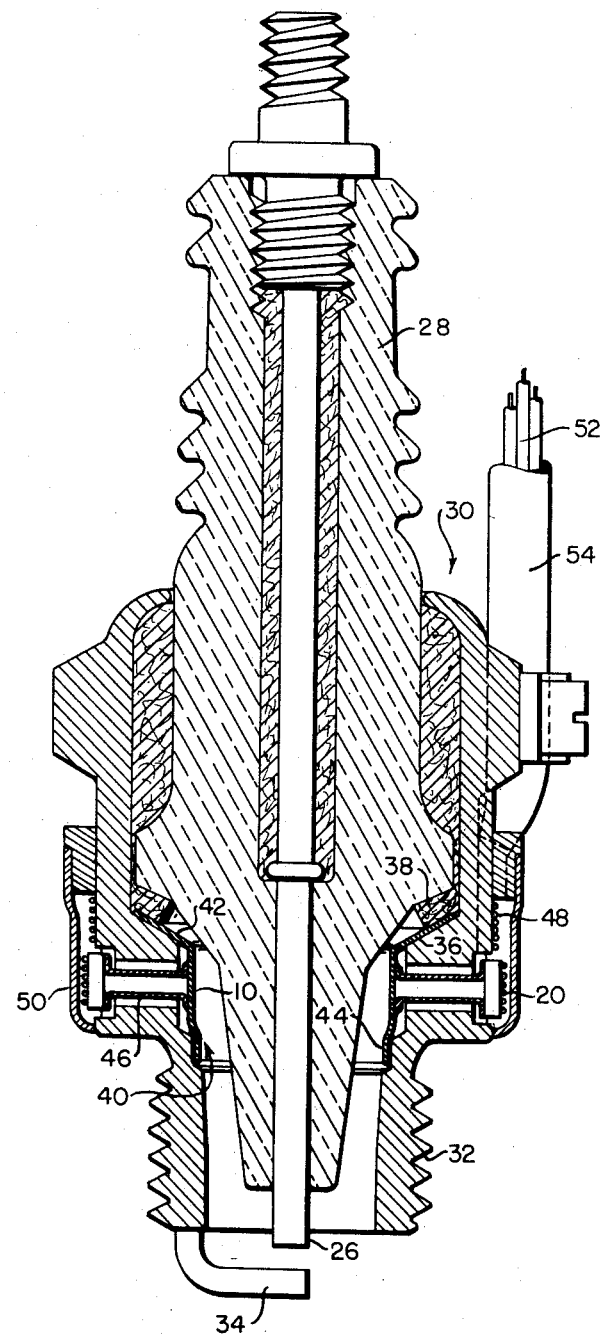

United States Patent Office 2,864,972
Patented Dec. 16, 1958

2,864,972

PRESSURE MEASURING APPARATUS

Yao T. Li, Watertown, Mass.

Application November 4, 1954, Serial No. 466,773

10 Claims. (Cl. 315—58)

The present invention relates to pressure measuring apparatus and more particularly to apparatus of the strain gage type, and is also concerned with pressure measuring apparatus particularly suitable for measurement of pressure variations in internal combustion engines.

An object of the present invention is the construction of a simple and accurate measuring device responsive to changes in pressure. Another object is to provide a device of this character in which compensation for variations in temperature is readily attained.

A still further object of the invention is the provision of an igniting device (e. g., a spark plug) incorporating a pressure measuring device in such a way that the characteristics and configuration of the igniting device are not substantially affected.

In the preferred form of the invention the pressure responsive device comprises a tube in the shape of a prism, that is, a tube which is polygonal in cross-section and has mounted thereon an unbonded strain gage which is affected by variations in internal pressure in the tube. Upon an increase of pressure the tube tends to distort into a shape in which the cross-section is a circle having a circumference substantially equal to that of the original polygon; in other words, the faces of the prism are bowed outwardly and the edges are drawn inwardly. This distortion is utilized according to the present invention to measure the internal pressure, and also according to a further feature of the invention to provide temperature compensation.

The invention may be embodied in an igniting device for an internal combustion engine, as for example, in a spark plug. Measurements of cylinder pressures in gasoline engines are most conveniently effected through the medium of the spark plug since the necessity of making extra holes in the cylinder head is avoided. It is important, however, that the characteristics and configuration of the plug itself should not be altered by the application of the pressure measuring means, since the spark plugs are designed for certain electrical and thermal characteristics, which should be retained if the pressure measurements are to be considered as representative. The present invention contemplates a spark plug structure, as will hereinafter be described in detail in which the characteristics of the igniting device are retained without substantial alteration, while affording opportunity for operation of the pressure measuring device incorporated therein.

In the accompanying drawings Fig. 1 is a section in plan showing one form of a pressure measuring device according to the present invention.

Fig. 5 is a sectional elevation of an igniting device according to the present invention.

Figure 1:
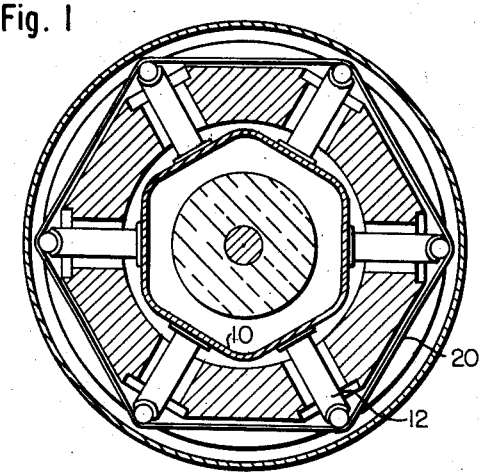
Figure 2:
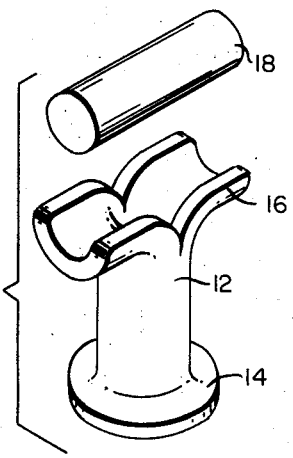
Fig. 2 is a detail view on a greatly enlarged scale of the strain gage support.

The pressure indicator shown in Fig. 1 comprises essentially a tube 10 in the shape of a regular prism (preferably a tube of hexagonal cross-section) and responsive internally to the pressure to be measured. Internal pressure tends to distort the prism into a cylinder. Mounted on the faces of the tube are supports shown at 12, each being preferably of the form indicated on a greatly enlarged scale in Fig. 2. Each tube 12 has a foot 14 secured to, as by brazing, a corresponding face of the pressure tube 10. At the top each tube 12 is split to form two channel-like wings 16 to receive a small strain gage supporting cylinder or roll 18 which is preferably of sapphire or other hard non-conducting material. A strain gage wire 20 is wound in several convolutions and is supported by the rolls 18. The other parts shown in Fig. 1 are of particular use in the spark plug which will be later described in detail, but the parts thus far described are sufficient to provide a gage for measuring the internal pressure or pressure variations within the tube 10. As heretofore stated, an internal pressure tends to cause the tube 10 to distort from a polygonal toward a circular cross-section, whereby the faces of the prism are bowed outwardly to increase the tension on the strain wires 20 and thus to change their electrical resistance in a well-known way.

Figure 3:
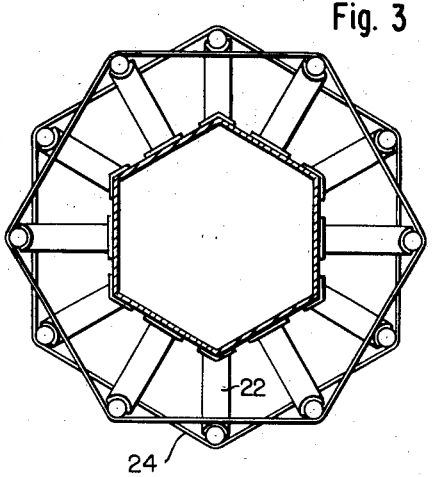
Figs. 3 and 4 are plan and isometric views, respectively, of a modified form of measuring apparatus.

The pressure indicating device shown in Fig. 3 is similar to that of Fig. 1 except that an additional set of force transmitting tubes 22 is located at the corners of the polygon, and a second strain gage wire 24 is independently mounted thereon. The arrangement is shown in isometric view in Fig. 4. Upon an increase in internal pressure the hexagon tends to assume the shape of the equi-circumferential circle; in other words, when the faces of the prism bow out the corners are drawn inwardly. Hence, an increase of pressure produces a stretch in the strain wires 20 and a decrease of tension in the strain wires 24. The wires may be connected to an appropriate bridge circuit so that an additive effect is obtained from the two wires upon a change of pressure. The gage wires 20 and 24 are of the "unbonded" type.

Figure 4:
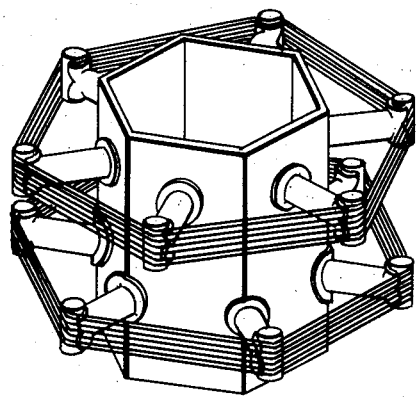

The construction of Figs. 3 and 4 is advantageous in providing temperature compensation. On a change of temperature causing expansion or contraction of the pressure measuring tube 10, both wires 20 and 24 are equally expanded or contracted. Their connection in the bridge circuit, as will hereinafter be described, is such that the simultaneous change in both wires produces no effect in the measuring circuit.

The pressure measuring device described above is especially suitable for inclusion in a spark plug for use as an engine pressure indicator. While various attempts have been made to combine a pressure indicator with a spark plug in order that the unit may be readily mounted in the cylinder head without the necessity of forming an additional hole, some difficulties have been experienced in maintaining the proper characteristics of the spark plug. The usual spark plug design involves a number of engineering compromises in respect to electrical insulation, dissipation of heat and temperature of the insulating material. If the measuring equipment is to indicate actual pressure conditions under standard operating conditions it is important that the spark plug be of a type and configuration similar to the plugs normally used in the engine.

A spark plug of improved type according to present invention is shown in Fig. 5. It comprises the usual central electrode 26 and porcelain insulator 28. The shell indicated generally at 30 is of conventional form, provided with the threads 32 and outer electrode 34. In accordance with usual spark plug construction, the lower part of the insulator is spaced well inwardly from the shell. Its general contour is also of conventional shape in that it is provided with the sloping surface 36 separated from a similar surface of the porcelain indicator by a gasket 38. These parts are important in spark plug design for reasons to be mentioned later.

Received within the shell 30 is a sleeve 40 having a prismatic portion 10 exactly similar to the tube 10 shown in Fig. 1. The sleeve is provided at its upper surface with a conical flared portion 42 which lies on the conical surface 36 of the shell and is separated from the porcelain insulator by the gasket 38. It will be seen therefore that the tube 10 is subjected to variations of internal pressure corresponding to the variations in engine cylinder pressure. The sleeve 40 has a skirt portion 44 brazed against the internal surface of the shell.

The shell is provided with six holes 46 within which the force transmitting tubes 12 are inserted. The feet of the tubes are then brazed to the prismatic tube 10, an operation which can be carried out by insertion of a suitable tool through the tubes 12. The parts of the plug shown in sectional elevation in Fig. 5 are also shown in sectional plan in Fig. 1. The strain wire 20 is wound on the supports as indicated in both Figs. 1 and 5.

It is also possible to provide holes through the shell at the corners of the polygon whereby the structure of Figs. 3 and 4 may be obtained. A simpler form of compensating winding has, however, been used and has been found satisfactory. It comprises simply a winding 48 wound on (but insulated from) a cylindrical portion of the shell immediately above the winding 20. The winding 48 is not a strain gage, but it provides some temperature compensation if the wire is of a material having a suitable temperature coefficient of resistance.

For protection of the windings 20 and 48 a sheet metal cap 50 may be placed over the end of the shell.

In operation of a properly designed spark plug, the heat is usually dissipated in a long path which runs upwardly from the bottom of the porcelain insulator, thence across the gasket 38 and down through the shell 30 and finally into the engine head. This long path is provided designedly since it is desired to maintain a high temperature in the lower part of the porcelain insulator, at least sufficiently to burn off any carbon deposits that may form on the insulator. It will be observed that while the holes 46 diminish the area of the path of heat flow, this diminution of area is negligible since the shell 30 is of relatively high heat conductivity compared to that of the insulator. On the other hand, if the double hexagonal arrangement of Fig. 3 is used in which twelve holes are required, the cross-section for heat flow is materially reduced and it may be desirable to use a shell of high heat conductivity rather than the usual steel shell.

Since substantially all of the heat dissipated by the plug passes through the shell 30, the shell assumes a fairly high temperature and it is for that reason that the simple compensating winding 48 shown in Fig. 5 becomes sufficiently affected by the temperature to serve as a suitable compensating winding for the gage. Moreover the winding 48 serves to provide magnetic compensation. Owing to the operation of the ignition system, the main winding 20 may be threaded by a magnetic field of considerable magnitude and of a frequency corresponding to one or more frequency components of the pressure cycle being measured. The winding 48 (or 24) is of approximately the same diameter and the same number of turns as the winding 20 lies close thereto, so that it is threaded by substantially the same magnetic flux, and hence may be connected for magnetic compensation.

Figure 6:
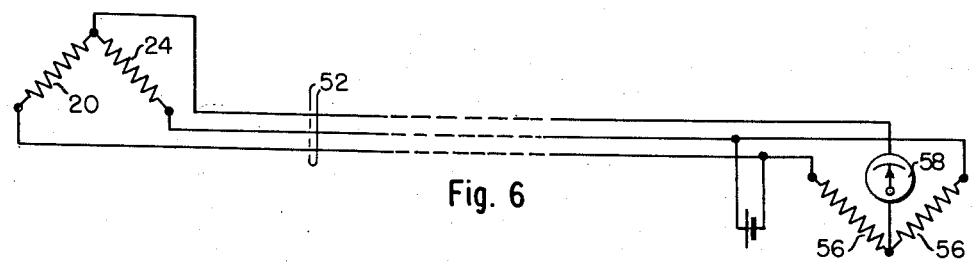
Fig. 6 is a diagram of a bridge circuit which may be used with the measuring device of the present invention.

The connections from the plug to the external circuit comprise three leads indicated at 52 and contained within a protecting tube 54 which is suitably mounted at the side of the spark plug as indicated in Fig. 5. The preferred circuit is shown Fig. 6 and comprises the strain gage wire 20 and the compensating winding 24 (or 48) connected with the leads 52, which in turn are connected with a suitable bridge circuit 56 of conventional form located at any convenient point remote from the plug. Variations in pressure are indicated by any suitable instrument, preferably of the recording type, but indicated diagrammatically as a simple meter 58.

The invention therefore comprises a pressure measuring device of the strain gage type, and in its more limited asspects comprises an igniting device for an internal combustion engine having a strain gage pressure indicating device incorporated therein in such a manner that the design and configuration of the igniting device are not substantially affected. The invention is not to be considered as limited to the particular structures herein shown but may be varied as will be clear to those skilled in the art.

Having thus described the invention, I claim:

1. A pressure responsive device comprising a hollow tube of prismatic contour, strain gage supports mounted on the faces of the prism, an unbounded strain gage wound on said supports around the exterior of the prism, and means for causing a pressure difference between the interior and exterior of the tube.

2. A pressure responsive device comprising a hollow tube in the form of a regular prism, strain gage supports mounted on and extending outwardly from the faces of the prism, an unbonded strain gage wound on said supports around the exterior of the tube, and means for causing a pressure difference between the interior and exterior of the tube.

3. A pressure measuring device comprising a hollow tube having the shape of a prism, a series of strain gage supports mounted on and extending outwardly from the faces of the prism, a strain gage wire wound on said supports, a second series of strain gage supports mounted at the edges of the prism and extending outwardly therefrom, and a second strain gage wire wound on said second series of supports, whereby a change of internal pressure changes the resistances of the two strain gages in opposite senses.

4. A combined igniting device and pressure measuring device for internal combustion engines comprising a shell, igniting means carried by the shell, a hollow pressure measuring tube surrounding the igniting means and having a portion in the form of a prism, the shell having a plurality of openings extending outwardly beyond the prism, the interior of the shell being substantially unobstructed in its communication with the combustion chamber of the engine by the presence of said tube, a series of strain gage supports mounted in the holes and engaging the faces of the prism, and a strain gage wire wound on said supports exteriorly of the shell.

5. A combined spark plug and pressure measuring device comprising a shell, a central electrode and an insulator spaced inwardly from the lower part of the shell, a hollow tube of prismatic form secured in the shell, the interior of the shell being substantially unobstructed in its communication with the combustion chamber of the engine by the presence of said tube, strain gage supports on the faces of the prism, and a strain gage wire on said supports.

6. A combined spark plug and pressure measuring device comprising a shell, a central electrode and an insulator spaced inwardly from the lower part of the shell, a hollow tube of prismatic form secured in the shell, the interior of the shell being substantially unobstructed in its communication with the combustion chamber of the engine by the presence of said tube, strain gage supports on the faces of the prism, a strain gage winding on said supports, and a temperature compensating winding wound on the exterior of the shell.

7. A combined spark plug and pressure measuring device comprising a shell, a central electrode and an insulator spaced inwardly from the lower part of the shell, a hollow tube of prismatic form secured in the shell, the interior of the shell being substantially unobstructed in its communication with the combustion chamber of the engine by the presence of said tube, strain gage supports on the faces of the prism, a strain gage winding on said supports, and a compensating winding on the shell near the strain gage winding for magnetic compensation.

8. A combined igniting device and pressure measuring device for internal combustion engines comprising a shell, an internal insulator within the shell, a central electrode within the insulator, an outer electrode carried by the shell, a prismatic tube supported within the shell and surrounding the insulator, the interior of the shell being substantially unobstructed in its communication with the combustion chamber of the engine by the presence of said tube, strain gage supports secured to the faces of the shell, and a strain gage wound on said supports circumferentially around the exterior of the tube, said strain gage being subjected to a change of length upon a change of internal pressure in the tube.

9. A combined igniting device and pressure measuring device for internal combustion engines comprising a shell, an internal insulator within the shell, a central electrode within the insulator, an outer electrode carried by the shell, a prismatic tube supported within the shell and surrounding the insulator, the interior of the shell being substantially unobstructed in its communication with the combustion chamber of the engine by the presence of said tube, strain gage supports secured to the faces of the shell, and a strain gage wound on said supports circumferentially around the exterior of the tube, said strain gage being subjected to a change of length upon a change of internal pressure in the tube, and a compensating around the shell in proximity to the strain gage to provide compensation for magnetic and temperature effects.

10. A pressure measuring device comprising a hollow tube having the shape of a prism, a series of strain gage supports mounted on and extending outwardly from the faces of the prism, a strain gage wire wound on said supports, a second series of strain gage supports mounted at the edges of the prism and extending outwardly therefrom, and a second strain gage wire wound on said second series of supports, the tube acting, upon an increase in internal pressure, to tend to assume a circular cross section, whereby the tension in one strain gage wire is increased and the tension in the other is reduced.

References Cited in the file of this patent

UNITED STATES PATENTS

| | | |
|---|---|---|
| 1,861,021 | Martin | May 31, 1932 |
| 2,543,141 | Vichnievsky | Feb. 27, 1951 |
| 2,544,567 | Rundell | Mar. 6, 1951 |
| 2,566,326 | Suillermin | Sept. 4, 1951 |
| 2,571,507 | Welch | Oct. 16, 1951 |
| 2,592,009 | Clement et al. | Apr. 8, 1952 |
| 2,627,749 | Li | Feb. 10, 1953 |
| 2,652,517 | Van Degrift et al. | Sept. 15, 1953 |
| 2,674,237 | Peters | Apr. 6, 1954 |

UNITED STATES PATENT OFFICE

CERTIFICATE OF CORRECTION

Patent No. 2,864,972                                    December 16, 1958

Yao T. Li

It is hereby certified that error appears in the printed specification of the above numbered patent requiring correction and that the said Letters Patent should read as corrected below.

Column 6, line 3, after "compensating" insert -- winding --.

Signed and sealed this 4th day of August 1959.

(SEAL)
Attest:

KARL H. AXLINE
Attesting Officer

ROBERT C. WATSON
Commissioner of Patents